(12) United States Patent
Uemura et al.

(10) Patent No.: US 6,275,647 B1
(45) Date of Patent: Aug. 14, 2001

(54) VIDEO TAPE RECORDER

(75) Inventors: Hidehito Uemura, Osaka; Masashi Omura, Hyogo; Junichi Sakamoto, Osaka, all of (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/646,714
(22) PCT Filed: Mar. 3, 2000
(86) PCT No.: PCT/JP00/01264
§ 371 Date: Dec. 6, 2000
§ 102(e) Date: Dec. 6, 2000

(30) Foreign Application Priority Data

Jun. 28, 1999 (JP) ............................................. P11-181289
Aug. 3, 1999 (JP) ............................................. P11-219746
Aug. 3, 1999 (JP) ............................................. P11-219747

(51) Int. Cl.$^7$ .................... H04N 5/928; H04N 5/783; H04N 5/782
(52) U.S. Cl. .................... 386/67; 386/74; 386/96
(58) Field of Search .................... 386/67, 68, 69, 386/74, 75, 78, 46, 96, 106, 1, 5, 39; 360/18, 21, 64, 121; H04N 5/928, 5/783, 5/782

(56) References Cited

U.S. PATENT DOCUMENTS

| | | | |
|---|---|---|---|
| 4,551,777 | * | 11/1985 | Saito et al. .............................. 360/77 |
| 4,958,246 | * | 9/1990 | Kozuki et al. ....................... 360/77.15 |
| 6,104,862 | * | 8/2000 | Amada et al. ......................... 386/103 |
| 6,125,001 | * | 9/2000 | Honsho et al. .......................... 360/84 |

FOREIGN PATENT DOCUMENTS

| | | |
|---|---|---|
| 3-84719 | 4/1991 | (JP) . |
| 5-266443 | 10/1993 | (JP) . |
| 6-103544 | 4/1994 | (JP) . |
| 6-103547 | 4/1994 | (JP) . |
| 7-73405 | 3/1995 | (JP) . |
| 11-073602 | 3/1999 | (JP) . |
| 11-224415 | 8/1999 | (JP) . |

* cited by examiner

Primary Examiner—Robert Chevalier
(74) Attorney, Agent, or Firm—Wenderoth, Lind & Ponack, L.L.P.

(57) ABSTRACT

In order to not only obtain excellent sound quality in a long-time recording mode not less than five times a standard recording mode by preventing, without narrowing a track pitch of a high-fidelity head, the high-fidelity head from tracing the third sound track from a target sound track as well as excellent picture quality free from crosstalk from an adjoining video track of a target video track but enable special playback without using a field memory in a video tape recorder, one head pair in conventional double azimuth type four heads for the standard recording mode and a threefold recording mode is used for video recording in the long-time recording mode and a head pair having a head width smaller than a width of a recording track is used exclusively for video playback in the long-time recording mode.

9 Claims, 6 Drawing Sheets ns a video tape recorder having a long-time recording mode not less than five times a standard recording mode.

BACKGROUND ART

In recent years, trend towards more inexpensive video tape recorders is gaining momentum and there is a demand for reduction of running cost of a magnetic tape. However, commercially available elongation of recording period has so far advanced to mere recording modes capable of recording for periods two and three times that of a standard recording mode. Hereinafter, the recording modes capable of recording for periods two and three times that of the standard recording mode are, respectively, referred to as a "twofold recording mode" and a "threefold recording mode". Similarly, recording modes capable of recording for periods four, five and six times that of the standard recording mode are, respectively, referred to as a "fourfold recording mode", a "fivefold recording mode" and a "sixfold recording mode".

Hereinafter, a prior art video tape recorder is described. Conventionally, a video tape recorder which enables recording and playback in the sixfold recording mode as the long-time recording mode not less than five times the standard recording mode is known from Japanese Patent Laid-Open Publication No. 7-73405 (1995). This video tape recorder is shown in FIGS. 5 and 6. In FIGS. 5 and 6 which are schematically explanatory of arrangements of rotary heads of the conventional video tape recorder, small circles laid along a large circumference represent the mounted heads. In FIG. 5, there are provided a single head pair 5 (5R, 5L) for the standard recording mode having a head width slightly smaller than a double of a track pitch of the threefold recording mode, double azimuth type four heads constituted by a head pair 7 (7R, 7L) for the threefold recording mode having a head width substantially equal to the track pitch of the threefold recording mode and a head pair 6 (6R, 6L) for the sixfold recording mode having a head width slightly smaller than a double of a track pitch of the sixfold recording mode and an audio head pair 4 (4R, 4L) used in all the recording modes.

Hereinafter, functions of the conventional video tape recorder of the above described arrangement are described with reference to Japanese Patent Laid-Open Publication No. 7-73405 (1995). Initially, recording and playback in the standard recording mode and interchangeable playback in the threefold recording mode are performed by the single head pair 5. Meanwhile, recording and playback in the threefold recording mode are performed by the head pair 7, while recording and playback in the sixfold recording mode are performed by the head pair 6 for the sixfold recording mode, in which the track width is slightly smaller than the double of the track pitch of the sixfold recording mode and an azimuth angle is so set as to range from ±0° to ±20°. Special playback in the standard, threefold and sixfold recording modes is complemented by a digital circuit employing a field memory.

Then, the arrangement of the heads shown in FIG. 6 is described. In double azimuth type four heads 1R, 1L, 9R and 9L, the heads 1R and 1L form a head pair E used for recording and playback in the standard recording mode and the heads 9R and 9L form a head pair F used for recording and playback in the threefold recording mode. Generally, head widths of the head pairs E and F are so selected as to be about 49 μm and 26 μm, respectively. Meanwhile, the heads 8R and 8L are provided as a head pair G for recording and playback in the sixfold recording mode. A head width of the head pair G is set to be slightly smaller than a double of the track pitch of the sixfold recording mode. Furthermore, a head pair B constituted by the heads 4R and 4L is commonly used for high-fidelity audio recording and playback in the standard, threefold and sixfold recording modes. Generally, in view of interchangeable playback, a track width of the head pair B is so selected as to range from 26 μm to 30 μm. Interchangeable playback in the standard and threefold recording modes, recording and playback in the standard recording mode and special playback in both of the standard and threefold recording modes are performed by the head pairs E and F. Meanwhile, during ordinary playback of a track in the threefold recording mode, the head pair G is used such that crosstalk from an adjoining track of the track does not happen.

However, in the arrangement of FIG. 5, since during special playback in all the recording modes, it is necessary to provide a digital circuit having a field memory for storing in one field a video signal obtained by subjecting a playback signal output to FM demodulation and a color-under signal, such a drawback is incurred that the burden of cost is heavy as described in Japanese Patent Laid-Open Publication No. 7-73405 (1995).

Meanwhile, since the four heads including the heads having the azimuth angle different from that of prior art and the normal heads for the standard recording mode for the track pitch narrower than that of prior art should be produced additionally, such a problem will arise that the burden of cost is heavy also in view of balance between capital investment and the number of the heads to be produced.

Moreover, in the arrangement of FIG. 6, the head pair G for the sixfold recording mode is used as a playback head so as to prevent crosstalk during recording and playback in the threefold recording mode but disadvantageously yields an output lower than that of fulltrack playback.

Meanwhile, FIGS. 5 and 6 are common to each other in that recording and playback in the sixfold recording mode are exclusively performed by the heads having the head width slightly smaller than the double of the track pitch of the sixfold recording mode. Since recording and playback are performed by the same heads, such a contradiction is incurred that during recording, the head width should be larger than the track pitch such that an unerased portion of high-fidelity sound is eliminated, while during playback of a track, the head width should be smaller than the track pitch such that crosstalk from an adjoining track of the track is obviated. At the same time, such an inconvenience is also incurred that sound quality of high-fidelity audio is deteriorated extremely or allowance for interchangeable playback of high-fidelity audio signals in the standard or threefold recording mode is lessened excessively. This point is not referred to in Japanese Patent Laid-Open Publication No. 7-73405 (1995).

This point is explained in the sixfold recording mode with reference to FIG. 7. FIG. 7 is conceptually indicative of how the heads of the conventional video tape recorder trace recording tracks. P1, P2, P3 and P4 are tracks of high-fidelity sound and video signals in the sixfold recording mode and have a pitch of 9.6 μm. The tracks P1 and P3 have an identical azimuth, while the tracks P2 and P4 have an identical azimuth.

The high-fidelity sound tracks and the video tracks do not necessarily coincide with each other but are here set to coincide with each other for simplification of the description. The head pair B is a high-fidelity head pair for performing recording and playback in the standard, threefold and sixfold recording modes and is composed of the heads 4L and 4R in FIGS. 5 and 6. Generally, in view of interchangeable playback, a head width of the head B is selected to range from 26 μm to 30 μm as described in Japanese Patent Laid-Open Publication No. 7-73405 (1995). Here, the head width of the head pair B is set at 26 μm. The head pair G is a video head for recording and playback in the sixfold recording mode and is composed of the heads 6L and 6R in FIG. 5 and the heads 8L and 8R in FIG. 6. A head width Twg of the head pair G is set to be slightly smaller than the double of the track pitch of the sixfold recording mode, i.e., less than 19.2 μm.

In FIG. 7, audio recording is performed by the head pair B. Since the head width of the head pair B is larger than the recording track pitch of 9.6 μm of the sixfold recording mode, the head pair B is disposed relative to the recording tracks as shown in FIG. 7. Likewise, since the video signals are recorded by the head pair G having the head width larger than the track pitch, the head pair G is disposed relative to the recording tracks as shown in FIG. 7. Then, during playback, if the audio head pair B traces the track P4 having the azimuth identical with that of the track P2 when the head pair B traces the track P2, sound quality is deteriorated extremely and thus, the head pair B is controlled so as to be shifted to a position B', for example. The third track from the track P2 has an azimuth identical with that of the track P2 and is the track P4 in FIG. 7. Meanwhile, a track abutting on the track P2 is referred to as an adjoining track of the track. Adjoining tracks of the track P2 are the tracks P1 and P3. When the head pair B is controlled so as to be shifted to a position where a maximum allowance for preventing tracing of the third track from the track P2 is secured, namely, the head B is shifted from the recording position through 8.2 μm (=(26−9.6)/2 μm) such that a center of the track P2 coincides with a center of the head pair B, so that the position B' is obtained. As a result, influence of intense crosstalk from the third track P4 from the track P2 can be averted. However, when the head pair B is shifted through 8.2 μm, the video head pair G is also shifted through 8.2 μm. Since the head pair G is originally designed to trace the track P2, it becomes necessary to increase the head width of the head pair G by 8.2 μm. Thus, the head pair G not only reproduces normal signals from the track P2 of 9.6 μm in width but undergoes crosstalk from the track P1 through as long as 8.2 μm. It follows that even the head pair 6 in which the azimuth angle has been changed is incapable of averting influence of deterioration of picture quality. On the contrary, if an attempt to prevent the head pair B from undergoing influence from the track P4 having the same azimuth as the track P2 is made by reducing the head width of the head pair B, it is difficult to guarantee interchangeability of FM sound in, especially, the standard recording mode.

DISCLOSURE OF INVENTION

The present invention solves the above mentioned problems of prior art and has for its object to provide a video tape recorder in which excellent sound quality is obtained in a long-time recording mode not less than five times a standard recording mode by preventing, without narrowing a track pitch of a high-fidelity head, the high-fidelity head from tracing the third track from a target track and excellent picture quality free from crosstalk from an adjoining track of the target track is obtained, while special playback in the standard recording mode and a threefold recording mode is performed without using a field memory.

In order to accomplish this object, a video tape recorder according to the present invention comprises: a head group A which corresponds to a standard recording mode and a twofold or threefold recording mode enabling recording for a period two or three times that of the standard recording mode and includes not less than one head pair used mainly for recording, playback and special playback of video signals; a head pair B which is mainly used for recording and playback of audio signals; and a head pair C which is used for playback of the video signals in a long-time recording mode not less than five times the standard recording mode; wherein a head width Twb of the head pair B and a track pitch Px of the long-time recording mode have a relation of (2xPx<Twb<3xPx); wherein the head pair C is disposed such that during playback in the long-time recording mode, in case a center of a head width of the head pair C traces a center of a video track having the video signals recorded by the head group A, the head pair B wholly traces a sound track having one azimuth and having the audio signals recorded by the head pair B and additionally traces an adjoining sound track of the sound track so as not to simultaneously trace, in the adjoining sound track, two portions in which the video signals have been recorded only once by the head group A after recording of the audio signals, with the adjoining sound track having an azimuth opposite to that of the sound track.

By this arrangement, since double azimuth type four heads and a high-fidelity head of prior art can be used, recording, playback and special playback in the standard recording mode and the twofold or threefold recording mode can be performed as in prior art. Therefore, since it is unnecessary to provide a digital circuit having a field memory for storing in one field a video signal obtained by subjecting a playback signal output to FM demodulation and a color-under signal, the burden of cost is lessened.

Meanwhile, since the newly added head pair C has an azimuth angle identical with that of prior art, capital investment therefor is reduced accordingly.

Furthermore, since the head pair C is provided so as to be exclusively used for playback in the long-time recording mode not less than five times the standard recording mode and full-track playback is performed in the threefold recording mode as in prior art, playback output does not drop.

Consequently, during playback in the long-time recording mode not less than five times the standard recording mode, it is possible to obtain excellent sound free from influence from the third track from the target track and excellent picture quality free from crosstalk from the adjoining track of the target track.

BEST MODE FOR CARRYING OUT THE INVENTION

Hereinafter, video tape recorders according to first and second embodiments of the present invention are, respectively, described with reference to FIGS. 1 to 3 and FIG. 4.

(First embodiment)

Figure 1:
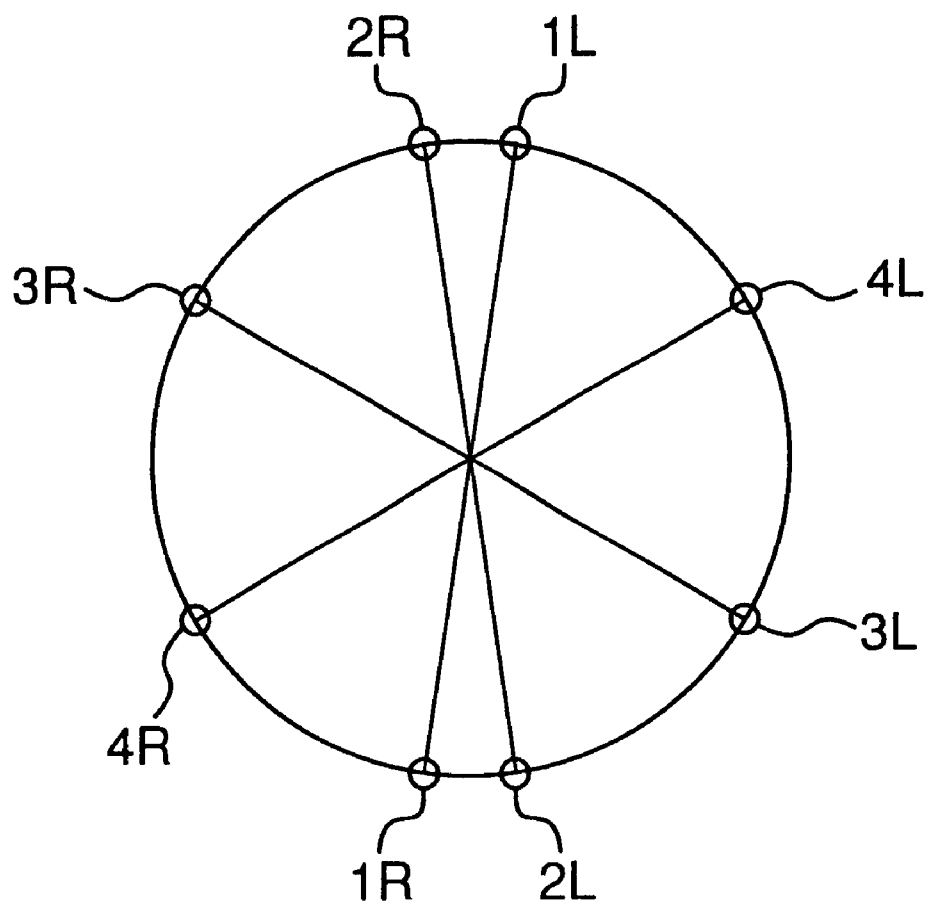
FIG. 1 is a view showing an arrangement of heads in a video tape recorder according to a first embodiment of the present invention.

FIG. 1 shows an arrangement of heads of the video tape recorder according to the first embodiment of the present invention. Small circles 1R, 1L, 2R, 2L, 3R, 3L, 4R and 4L laid along a large circumference represent the mounted heads. A head group A is constituted by double azimuth type four heads 1 R, 1L, 2R and 2L. A head pair 2R and 2L in the head group A is referred to as a "head pair D". A head width Twd of the head pair D is set to have a relation of (Twd<2xPx) in which "Px" denotes a track pitch of a long-time recording mode not less than five times a standard recording mode. Then, a head pair composed of the heads 4L and 4R is referred to as a "head pair B". A head width Twb of the head pair B is set to have a relation of (2xPx<Twb<3xPx). Subsequently, a head pair composed of the heads 3R and 3L is referred to as a "head pair C". A head width Twc of the head pair C is set to have a relation of (Twc≦Px).

Functions of the video tape recorder of the above described arrangement are described below. The head group A is used for performing video recording, playback and special playback in the standard recording mode and a twofold or threefold recording mode. The head pair B is used for performing recording, playback and special playback of FM sound in all of the standard, twofold and threefold recording modes and the long-time recording mode not less than five times the standard recording mode. The head pair C is used only for performing only playback of video signals in the long-time recording mode not less than five times the standard recording mode. The head pair D performs video recording in the long-time recording mode not less than five times the standard recording mode. Recording, playback and special playback of video and audio in the standard, twofold and threefold recording modes are known and therefore, are not described here.

Figure 2:
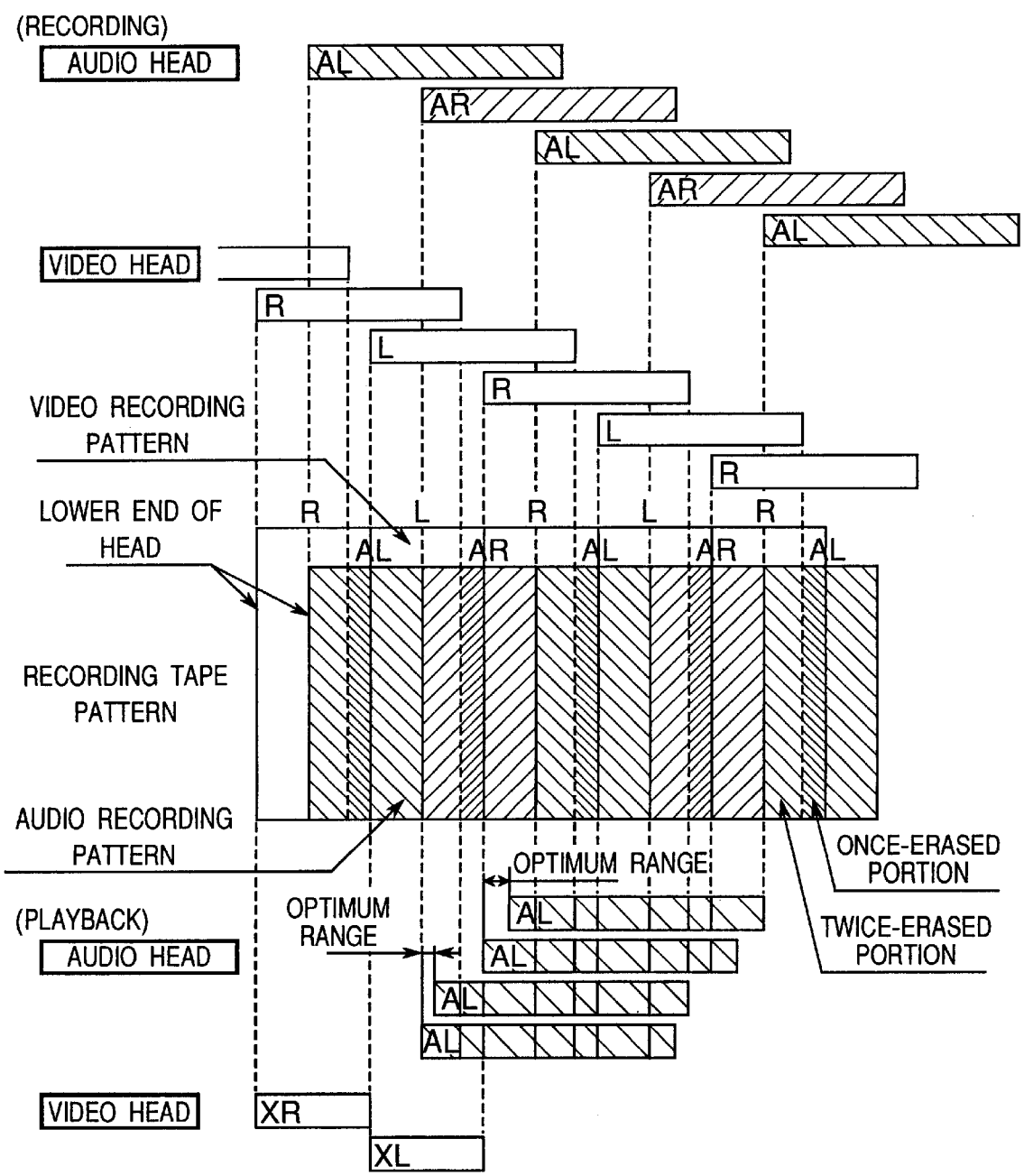
FIG. 2 is a view showing conceptually how the heads of the video tape recorder of FIG. 1 trace recording tracks.

Then, operation of the video tape recorder during recording in the long-time recording mode not less than five times the standard recording mode is described with reference to FIG. 2. FIG. 2 conceptually illustrates how the heads of the video tape recorder according to the first embodiment of the present invention trace recording tracks of the long-time recording mode not less than five times the standard recording mode. Audio heads AL and AR form the head pair B corresponding to the heads 4R and 4L in FIG. 1 and are provided for performing recording and playback of FM sound. Video heads L and R form the head pair D corresponding to the heads 2L and 2R in FIG. 1 and are provided for performing video recording in the long-time recording mode not less than five times the standard recording mode. Video heads XL and XR form the head pair C corresponding to the heads 3R and 3L in FIG. 1 and are exclusively used for video playback in the long-time recording mode not less than five times the standard recording mode. In FIG. 2, a lateral shift distance from the head AL to the head AR represents the track pitch Px and azimuth directions are mimetically illustrated in a portion entitled "Recording tape pattern". An azimuth of a target track is opposite to that of an adjoining track of the target track and is identical with that of the third track from the target track. In this example, high-fidelity sound tracks and video tracks deviate from each other.

In FIG. 2, audio recording is performed by the head pair B. Since the head width Twb of the head pair B has the relation of (2xPx<Twb<3xPx), the head pair B is disposed relative to the recording tracks as shown in FIG. 2. Video recording is performed by the head pair D. Since the head width Twd of the head pair D has the relation of (Px<Twd<2xPx), a portion in which video signals have been recorded only once after audio recording, i.e., a once erased portion and a portion in which the video signals have been recorded twice after audio recording, i.e., a twice-erased portion exist as shown in FIG. 2. During recording of a target track, the head pair D does not affect the third track from the target track, which has an azimuth identical with that of the target track. Namely, overwrite of the same azimuth is not performed by the head pair D.

Subsequently, during playback in the long-time recording mode not less than five times the standard recording mode, automatic tracking is effected so as to maximize playback output of the head pair C, for example. Since the head width Twc of the head pair C is set to have the relation of (Twc≦Px), the head pair C can trace only signals of a video track, so that it is possible to obtain playback video signals completely free from crosstalk from an adjoining video track of the video track. As a result, during playback in the long-time recording mode not less than five times the standard recording mode, a center of the head pair C can be made coincident with that of the video track.

Figure 3:
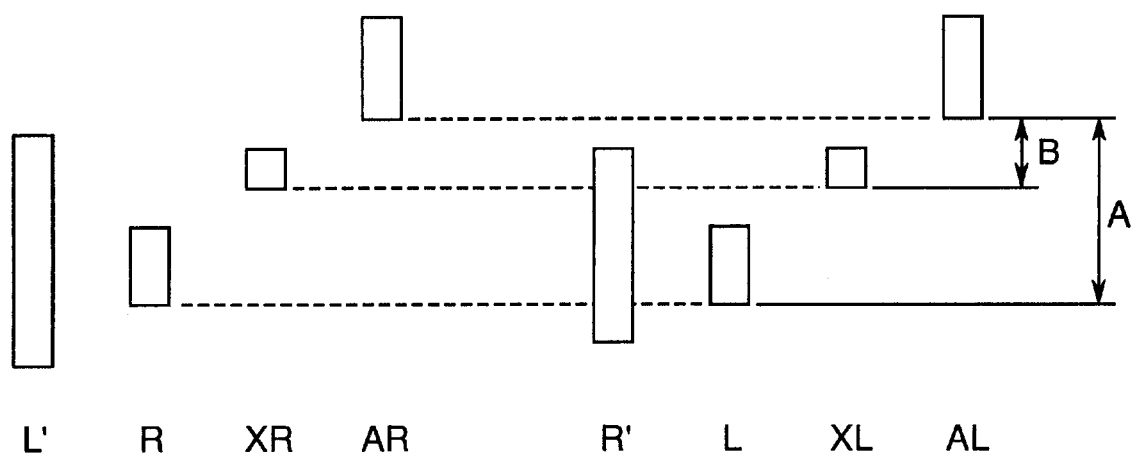
FIG. 3 is a mimetic diagram showing mounting heights of the head pairs of the video tape recorder of FIG. 1.

Here, positional relation of the respective head pairs is described with reference to FIG. 3. FIG. 3 is a mimetic diagram showing mounting heights of the respective head pairs, in which vertical and lateral axes indicate the mounting heights of the heads and a radial direction of a rotary head cylinder, respectively. The respective head pairs are mounted on the rotary head cylinder at an interval of about 60° as shown in FIG. 1. During running of a tape, an interval of 180° on the rotary head cylinder corresponds to a deviation of one track pitch. Hence, an interval of 60° on the rotary head cylinder corresponds to a deviation of one-third of the track pitch. In order to produce an arbitrary deviation among the heads, the mounting heights of the heads should be adjusted. In FIG. 3, the head pair B of the heads AR and AL is by an amount of A higher than the head pair D of the heads R and L, while the head pair C of the heads XR and XL is by an amount of B lower than the head pair B of the heads AR and AL.

By this arrangement, in case the head pair C traces the video tracks, the audio head pair B is shifted through the interval on the rotary cylinder head and the amount of B in FIG. 3 from the head pair C. As a result, the head pair C is disposed such that during playback of audio signals, the head pair B wholly traces a sound track having one azimuth and having the audio signals recorded by the head pair B and additionally traces an adjoining sound track of the sound track so as not to simultaneously trace, in the adjoining sound track, two portions in which video 17 signals have been recorded only once by the head group A after recording of the audio signals, with the adjoining sound track having an azimuth opposite to that of the sound track. Meanwhile, it is known that noise components of the portion in which the video signals have been recorded only once after recording of the audio signals, i.e., the once-erased portion are larger than those of the portion in which the video signals have been recorded twice after recording of the audio signals, i.e., the twice-erased portion. Therefore, when the head pair B traces a high-fidelity sound track, there is little probability that the head pair B traces the third track from the target track. Meanwhile, when the head pair B traces an adjoining track of the target track, the head pair B may trace one once-erased portion having large noise components but does not trace two once-erased portions, so that it is possible to obtain excellent sound which is least affected by not only the third track from the target track but the adjoining track of the target track. As a result, the head pairs B and D are also shifted through the same distance as that of shift of the head pair C. Meanwhile, the head pair C is not used for recording.

Meanwhile, in the video tape recorder, it is possible to employ conventional double azimuth type four heads and a known high-fidelity head. Therefore, since recording and playback and special playback in the standard recording mode and the twofold or threefold recording mode can be performed in the same manner as prior art, it is unnecessary to provide a digital circuit having a field memory for storing in one field a video signal obtained by subjecting a playback signal output to FM demodulation and a color-under signal, thereby resulting in reduction of the production cost.

Meanwhile, since the newly added head pair C has an azimuth angle identical with that of prior art, capital investment therefor is reduced accordingly.

Furthermore, since the head pair C is provided so as to be exclusively used for playback in the long-time recording mode not less than five times the standard recording mode and full-track playback is performed in the threefold recording mode as in prior art, playback output does not drop.

For the following reason, a fivefold recording mode is practical as the long-time recording mode not less than five times the standard recording mode. In "VHS format" (trademark of Victor Co. of Japan, Ltd.), a track pitch of the standard recording mode of the NTSC (National Television System Committee) system is 58 $\mu$m. The head pair D is used for recording in both of the threefold recording mode and an N-fold recording mode. A track pitch P3 of the threefold recording mode is 19.3 $\mu$m (=58/3 $\mu$m). Therefore, the head width Twd of the head pair D should be not less than 19.3 $\mu$m. On the other hand, a track pitch of the N-fold recording mode is 58/N $\mu$m. In order to restrain deterioration of picture quality due to overwrite of video signals and avoid overwrite of the same azimuth by the head pair D during recording in the N-fold recording mode, the head width Twd of the head pair D should have a relation of (Twd<2x58/N).

Accordingly, an integer having the relation of (19.3 $\mu$m≦Twd<2x58/N $\mu$m) is less than 6. In view of scatter of mechanical precision, a maximum of the integer N is 5. Consequently, the fivefold recording mode is practical.

Meanwhile, the maximum of the integer N is 5 due to the condition that the head pair D is also used for recording and playback in the threefold recording mode. However, in case the head pair D is not used for recording and playback in the threefold recording mode, a minimum of the head width Twd can be reduced further. At this time, it is needless to say that the integer N may be set to be larger than 5.

(Second embodiment)

Figure 4:
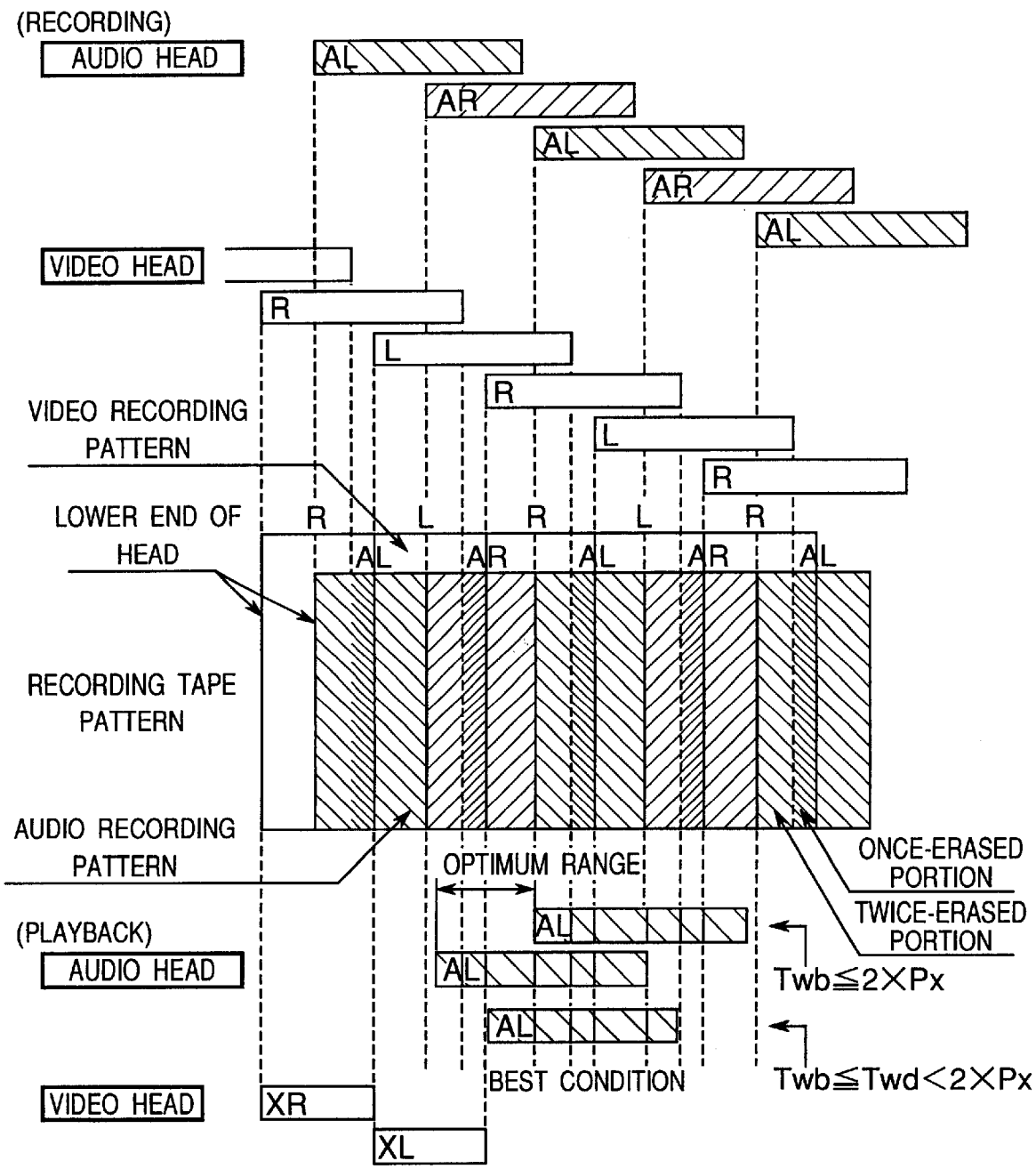
FIG. 4 is a view showing conceptually how heads of a video tape recorder according to a second embodiment of the present invention trace recording tracks.
Figure 5:
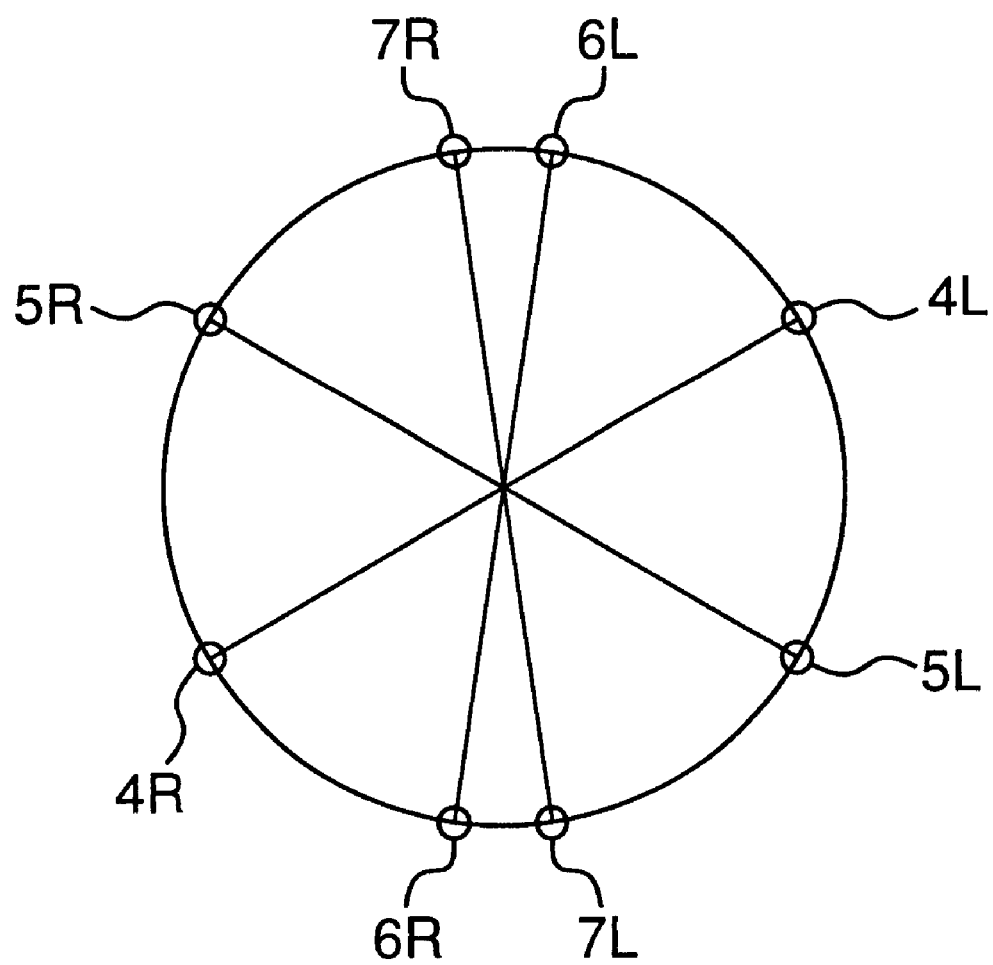
FIG. 5 is a schematic view explanatory of an arrangement of heads in a prior art video tape recorder.
Figure 6:
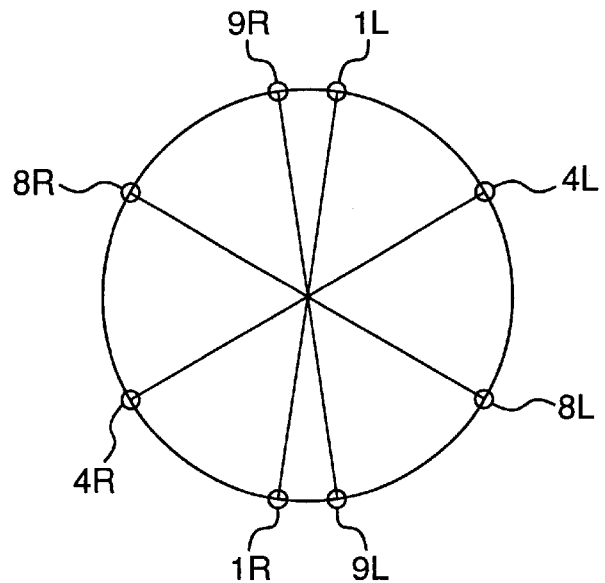
FIG. 6 is a schematic view explanatory of another arrangement of the heads in the prior art video tape recorder.
Figure 7:
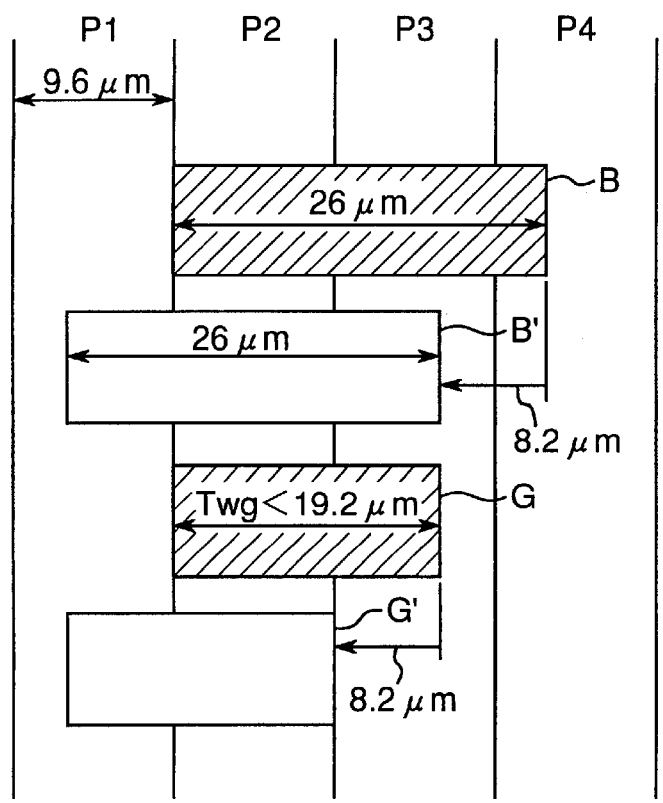
FIG. 7 is a view showing conceptually how the heads of the prior art video tape recorder trace recording tracks.

Hereinafter, the video tape recorder according to the second embodiment of the present invention is described with reference to FIG. 4. In FIG. 4, since the head width Twb of the head pair B has a relation of (Twb≦2xPx), the heads of the head pair B are disposed relative to the recording tracks as shown in FIG. 4.

Especially, when the head width Twb of the head pair B has the relation of (Twb≦2xPx) and the head width Twd of the head pair D has a relation of (Twd≧Twb), the head pair B can be interposed between once-erased portions in opposite adjoining sound tracks of a high-fidelity sound track. Therefore, in case the head pair B traces the high-fidelity sound track as a target sound track, there is little probability that the head pair B traces the third sound track from this target sound track. Meanwhile, in case the head pair B traces the adjoining sound track of the target sound track, the head pair B does not trace, in the adjoining sound track, the once-erased portion having large noise components. Therefore, it is possible to obtain excellent sound which is least affected by not only the third sound track from the target sound track but the adjoining sound track of the target sound track.

Since other constructions of the video tape recorder according to the second embodiment of the present invention are similar to those of the video tape recorder according to the first embodiment of the present invention, the description is abbreviated for the sake of brevity.

As is clear from the foregoing description, the following fine effects are gained in the first embodiment of the present invention.

During recording in the long-time recording mode not less than five times the standard recording mode, video and FM sound are, respectively, recorded by the head pair D in the head group A, which has the head width positively larger than the track pitch of the long-time recording mode not less than five times the standard recording mode and the head pair B. Meanwhile, the head pair C is exclusively used for playback of the video signals in the long-time recording mode not less than five times the standard recording mode. Therefore, it is possible to employ an arrangement of a head group A identical with that of a conventional video tape recorder which does not have the long-time recording mode not less than five times the standard recording mode and it is possible to perform special playback in the standard recording mode and the twofold or threefold recording mode.

The head pair C is disposed such that the head pair B wholly traces a sound track having one azimuth and having the audio signals recorded by the head pair B and additionally traces an adjoining sound track of the sound track so as not to simultaneously trace, in the adjoining sound track, two portions in which the video signals have been recorded only once by the head group A after recording of the audio signals, with the adjoining sound track having an azimuth opposite to that of the sound track.

Therefore, when the head pair B traces a high-fidelity sound track as a target sound track, there is little probability that the head pair B traces the third sound track from this target sound track. Meanwhile, when the head pair B traces an adjoining sound track of the target sound track, the head pair B may trace one once-erased portion having large noise components but does not trace two once-erased portions. Accordingly, it is possible to obtain excellent sound which is least affected by not only the third sound track from the target sound track but the adjoining sound track of the target sound track.

Meanwhile, since it is unnecessary to provide a digital circuit having a field memory for storing in one field a video signal obtained by subjecting a playback signal output to FM demodulation and a color-under signal, the burden of cost is lessened.

Meanwhile, since the newly added head pair C has an azimuth angle identical with that of prior art, capital investment therefor is reduced accordingly.

Furthermore, since the head pair C is provided so as to be exclusively used for playback in the long-time recording mode not less than five times the standard recording mode and full-track playback is performed in the threefold recording mode as in prior art, playback output does not drop.

Meanwhile, since the head pair D used for recording in the long-time recording mode not less than five times the standard recording mode is provided in the head group A and the head width Twd of the head pair D and the track pitch Px of the long-time recording mode not less than five times the standard recording mode have a relation of (Twd<2xPx), overwrite of the same azimuth is not performed by the head pair D in the long-time recording mode not less than five times the standard recording mode. Therefore, it is possible to restrain deterioration of picture quality due to overwrite of video signals.

Meanwhile, since the head width Twb of the head pair B and the track pitch Px of the long-time recording mode not less than five times the standard recording mode have a relation of (2xPx<Twb<3xPx), the head pair B can be controlled not only so as to guarantee interchangeable playback in the twofold or threefold recording mode but so as not to trace, during playback of a target sound track in the long-time recording mode not less than five times the standard recording mode, the third sound track from the target sound track.

Meanwhile, since the head width Twc of the head pair C and the track pitch Px of the long-time recording mode not less than five times the standard recording mode have a relation of (Twc≦Px), during playback of a video track in the long-time recording mode not less than five times the standard recording mode, it is possible to provide excellent picture quality by obtaining video signals substantially free from crosstalk from an adjoining video track of the video track.

Meanwhile, in addition to the above described effects of the first embodiment, the following marked effects are achieved in the second embodiment of the present invention.

The head pair C is disposed such that the head pair B wholly traces a sound track having one azimuth and having the audio signals recorded by the head pair B and additionally traces an adjoining sound track of the sound track so as not to trace, in the adjoining sound track, a portion in which the video signals have been recorded only once by the head group A after recording of the audio signals, with the adjoining sound track having an azimuth opposite to that of the sound track. Therefore, when the head pair B traces a high-fidelity sound track as a target sound track, there is little probability that the head pair B traces the third sound track from the target sound track. Meanwhile, when the head pair B traces an adjoining sound track of the target sound track, the head pair B does not trace the portion having large noise components. Accordingly, it is possible to obtain excellent sound which is least affected by not only the third sound track from the target sound track but the adjoining sound track of the target sound track.

Meanwhile, since the head width Twb of the head pair B and the track pitch Px of the long-time recording mode five times the standard recording mode have a relation of (Twb≦2xPx), the head pair B can be controlled not only so as to guarantee interchangeable playback in the twofold or threefold recording mode but so as not to trace, during playback of a target sound track in the long-time recording mode five times the standard recording mode, the third sound track from the target sound track.

What is claimed is:

1. A video tape recorder comprising:
    a head group A which corresponds to a standard recording mode and a twofold or threefold recording mode enabling recording for a period two or three times that of the standard recording mode and includes not less than one head pair used mainly for recording, playback and special playback of video signals;
    a head pair B which is mainly used for recording and playback of audio signals; and
    a head pair C which is used for playback of the video signals in a long-time recording mode not less than five times the standard recording mode;
    wherein a head width Twb of the head pair B and a track pitch Px of the long-time recording mode have a relation of (2xPx<Twb<3xPx);
    wherein the head pair C is disposed such that during playback in the long-time recording mode, in case a center of a head width of the head pair C traces a center of a video track having the video signals recorded by the head group A, the head pair B wholly traces a sound track having one azimuth and having the audio signals recorded by the head pair B and additionally traces an adjoining sound track of the sound track so as not to simultaneously trace, in the adjoining sound track, two portions in which the video signals have been recorded only once by the head group A after recording of the audio signals, with the adjoining sound track having an azimuth opposite to that of the sound track.

2. A video tape recorder as claimed in claim 1, wherein the head group A includes a head pair D used for recording in the long-time recording mode and a head width Twd of the head pair D has a relation of (Twd<2xPx).

3. A video tape recorder as claimed in claim 1, wherein a head width Twc of the head pair C has a relation of (Twc≦Px).

4. A video tape recorder comprising:
    a head group A which corresponds to a standard recording mode and a twofold or threefold recording mode enabling recording for a period two or three times that of the standard recording mode and includes not less than one head pair used mainly for recording, playback and special playback of video signals;
    a head pair B which is mainly used for recording and playback of audio signals; and
    a head pair C which is used for playback of the video signals in a long-time recording mode not less than five times the standard recording mode;
    wherein a head width Twb of the head pair B and a track pitch Px of the long-time recording mode have a relation of (Twb≦2xPx);
    wherein the head group A includes a head pair D used for recording in the long-time recording mode and a head width Twd of the head pair D has a relation of (Twd≧Twb);
    wherein the head pair C is disposed such that during playback in the long-time recording mode, in case a center of a head width of the head pair C traces a center of a video track having the video signals recorded by the head group A, the head pair B wholly traces a sound track having one azimuth and having the audio signals recorded by the head pair B and additionally traces an adjoining sound track of the sound track so as not to trace, in the adjoining sound track, a portion in which the video signals have been recorded only once by the head group A after recording of the audio signals, with the adjoining sound track having an azimuth opposite to that of the sound track.

5. A video tape recorder comprising:
    a head group A which corresponds to a standard recording mode and a twofold or threefold recording mode enabling recording for a period two or three times that of the standard recording mode and includes not less than one head pair used mainly for recording, playback and special playback of video signals;

a head pair B which is mainly used for recording and playback of audio signals; and a head pair C which is used for playback of the video signals in a long-time recording mode not less than five times the standard recording mode;

wherein a head width Twb of the head pair B and a track pitch Px of the long-time recording mode have a relation of (Twb≦2xPx);

wherein the head pair C is disposed such that during playback in the long-time recording mode, in case a center of a head width of the head pair C traces a center of a video track having the video signals recorded by the head group A, the head pair B wholly traces a sound track having one azimuth and having the audio signals recorded by the head pair B and additionally traces an adjoining sound track of the sound track so as not to simultaneously trace, in the adjoining sound track, two portions in which the video signals have been recorded only once by the head group A after recording of the audio signals, with the adjoining sound track having an azimuth opposite to that of the sound track.

6. A video tape recorder as claimed in claim 4, wherein the head width Twd of the head pair D has a relation of (Twd<2xPx).

7. A video tape recorder as claimed in claim 5, wherein the head group A includes a head pair D used for recording in the long-time recording mode and a head width Twd of the head pair D has a relation of (Twd<2xPx).

8. A video tape recorder as claimed in claim 4, wherein a head width Twc of the head pair C has a relation of (Twc≦Px).

9. A video tape recorder as claimed in claim 5, wherein a head width Twc of the head pair C has a relation of (Twc≦Px).

* * * * *